March 20, 1973 L. M. MOTT-SMITH 3,721,311
MARINE SEISMIC SOURCE EMPLOYING THE WATER-HAMMER EFFECT
Filed March 11, 1970 4 Sheets-Sheet 1
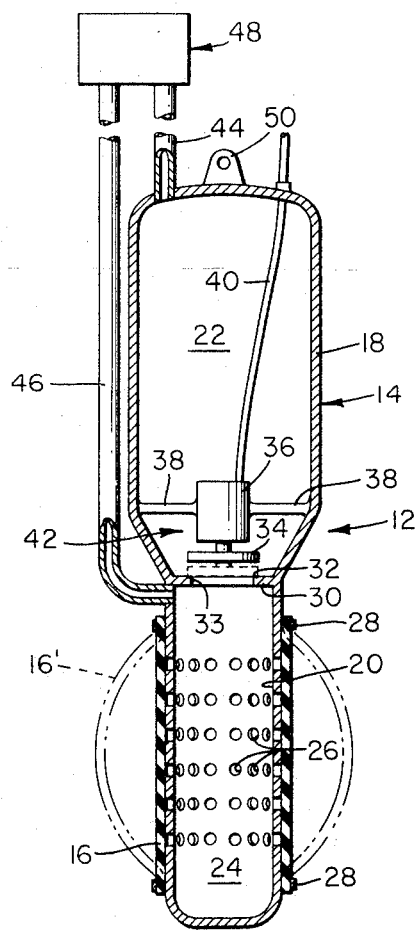
FIG_1
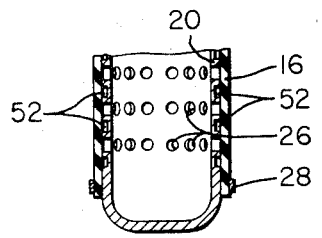
FIG_2
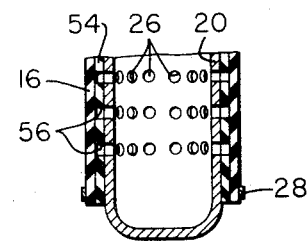
FIG_3
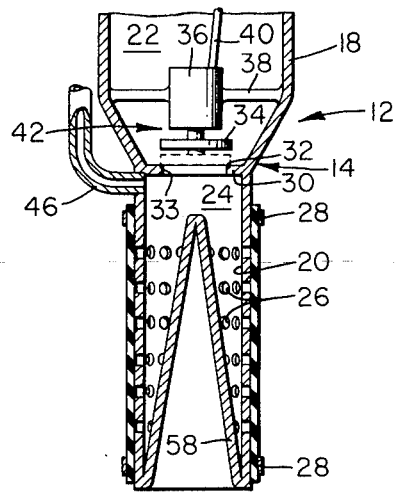
FIG_4
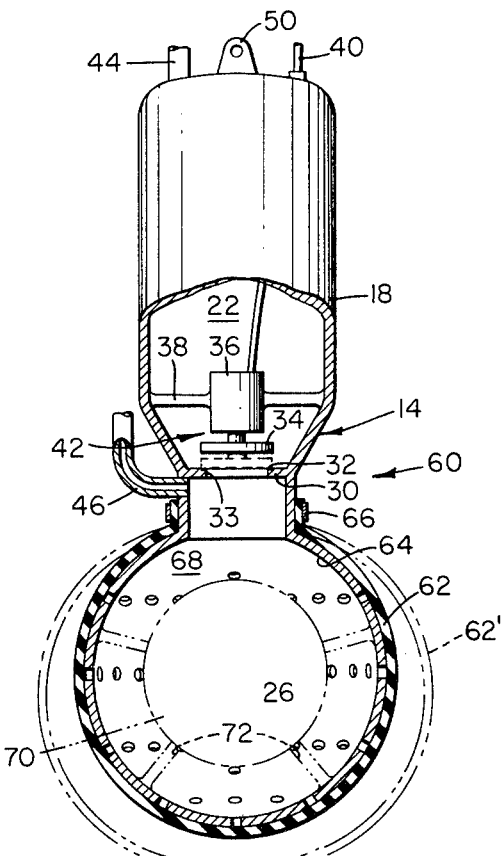
FIG_5
INVENTOR.
LEWIS MORTON MOTT-SMITH
BY
*Robert D. Clay*
ATTORNEY

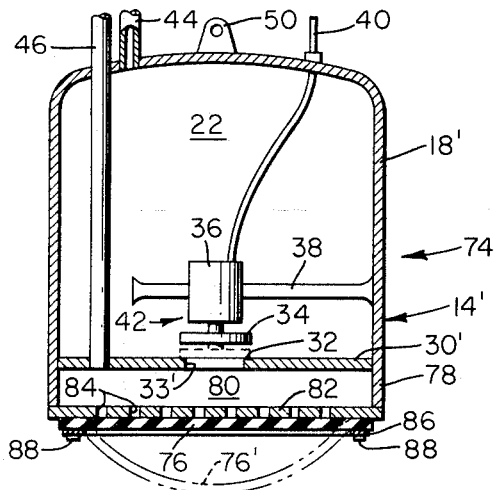
FIG_6
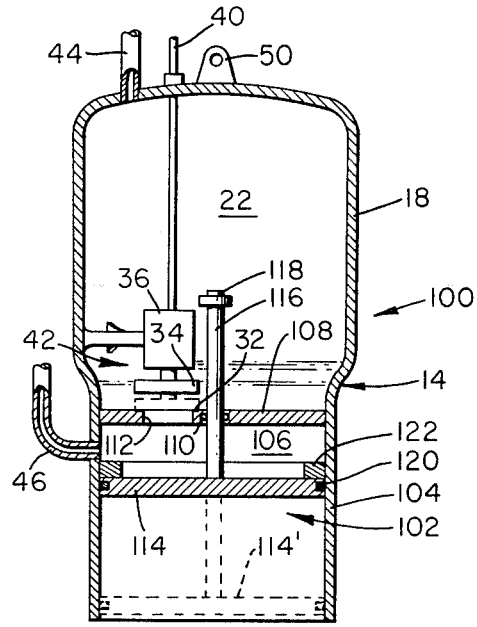
FIG_9
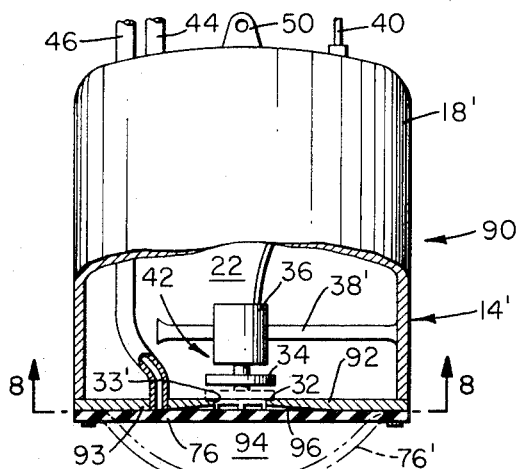
FIG_7
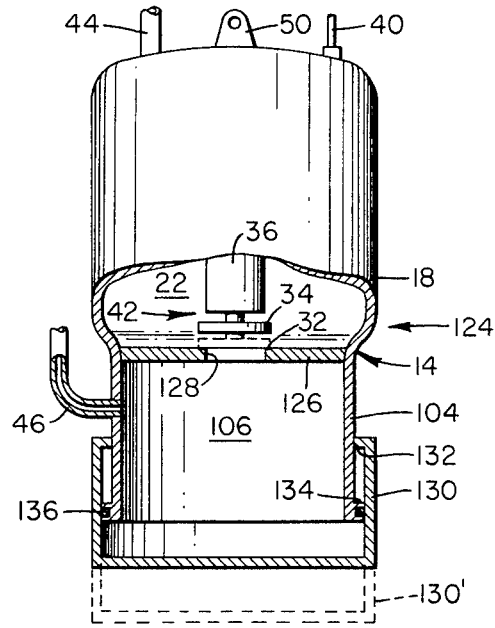
FIG_10
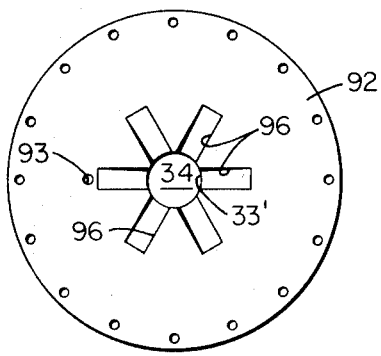
FIG_8
INVENTOR.
LEWIS MORTON MOTT-SMITH
BY
Robert H. Clay
ATTORNEY March 20, 1973  L. M. MOTT-SMITH  3,721,311
MARINE SEISMIC SOURCE EMPLOYING THE WATER-HAMMER EFFECT
Filed March 11, 1970  4 Sheets-Sheet 3
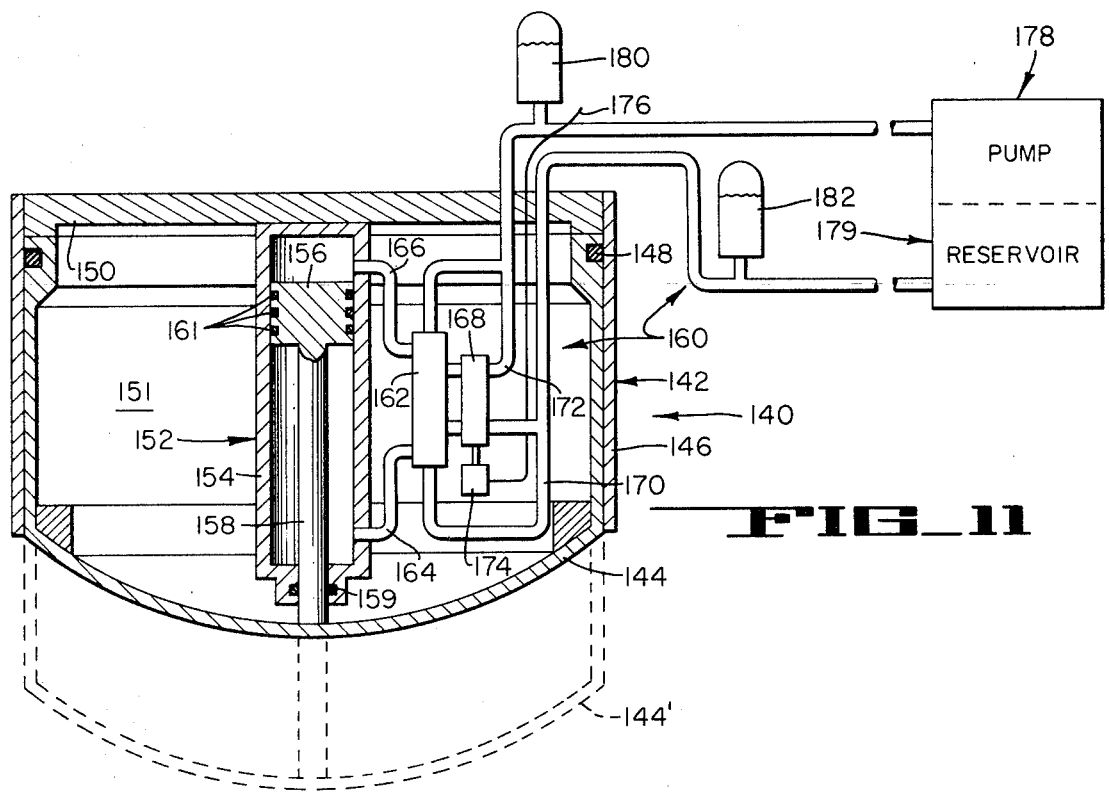
FIG_11
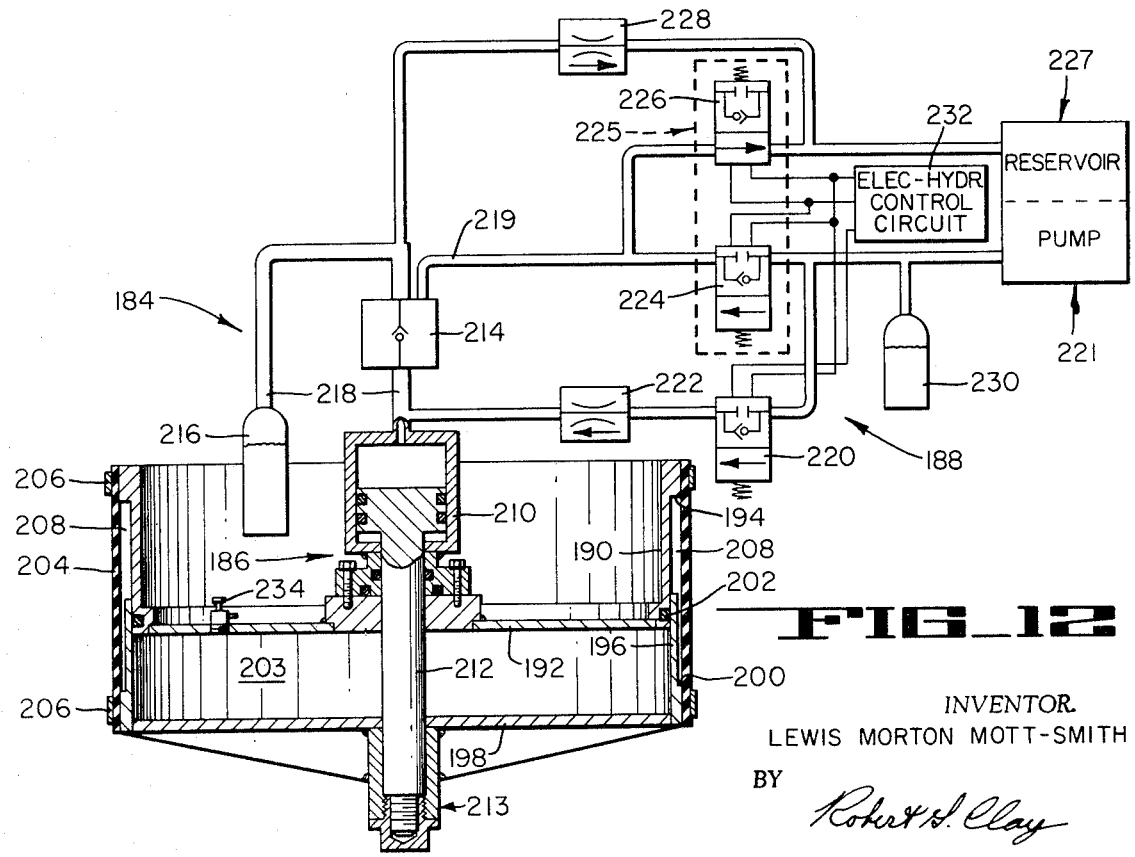
FIG_12
INVENTOR.
LEWIS MORTON MOTT-SMITH
BY
Robert H. Clay
ATTORNEY March 20, 1973  L. M. MOTT-SMITH  3,721,311
MARINE SEISMIC SOURCE EMPLOYING THE WATER-HAMMER EFFECT
Filed March 11, 1970  4 Sheets-Sheet 4
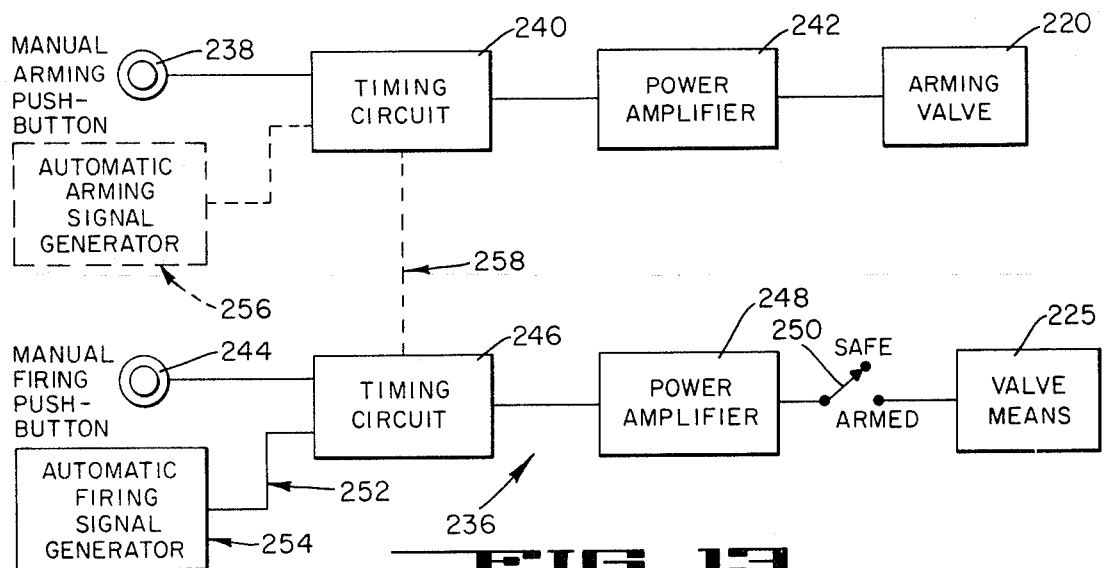
FIG_13
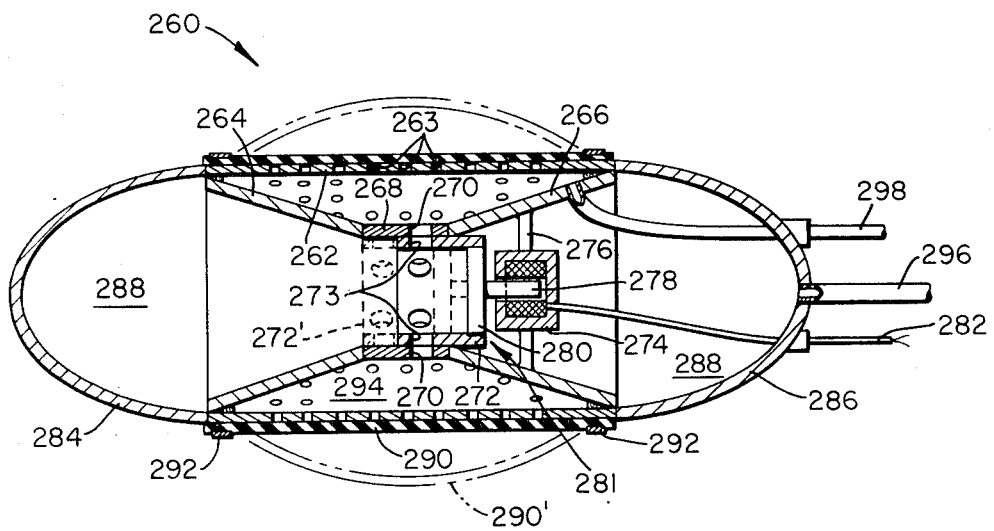
FIG_14
INVENTOR.
LEWIS MORTON MOTT-SMITH
BY
*Robert H. Clay*
ATTORNEY

United States Patent Office 3,721,311
Patented Mar. 20, 1973

3,721,311
MARINE SEISMIC SOURCE EMPLOYING THE
WATER-HAMMER EFFECT
Lewis Morton Mott-Smith, Houston, Tex., assignor to
Mandrel Industries, Inc., Houston, Tex.
Filed Mar. 11, 1970, Ser. No. 18,418
Int. Cl. G01v 1/14, 1/38
U.S. Cl. 181—.5 H                                    16 Claims

ABSTRACT OF THE DISCLOSURE

Apparatus for generating a seismic signal in a fluid medium wherein a member such as a flexible diaphragm, inflatable elastic member, piston, etc., is placed in a first or initial position relatively slowly by a pneumatic, hydraulic, electrical, mechanical etc., system, and upon firing is allowed to move rapidly to a second position, where it is abruptly stopped. That is, the member provides for the slow creation of a selected volume within the fluid medium which volume is then allowed to shrink rapidly whereupon its motion is suddenly arrested. The hydrostatic pressure of the fluid medium causes the medium to follow the movement of the member, whereby abruptly stopping the member likewise suddenly stops the fluid movement to generate, in turn, a single high pressure pulse due to the water-hammer effect. Thus, the invention is concerned with generating a single seismic pulse by the more efficient process of suddenly stopping, rather than by suddenly accelerating, a given quantity of the surrounding fluid medium.

BACKGROUND OF THE INVENTION

(1) Field of the invention

The invention relates to a non-explosive source of signals for marine seismic exploration, and more particularly to a marine source wherein the pulse is generated via the water-hammer effect by the sudden deceleration of a quantity of water, rather than by accelerating a quantity as when generating an expanding bubble.

(2) Description of the prior art

There are various air-operated seismic sources presently in use which, for the most part, generate a seismic signal or a plurality of impulses in a surrounding water medium by ejecting a burst, or bursts, of high pressure air into the medium. These sources require air pressures of the order of, for example, hundreds to thousands of pounds per square inch (p.s.i.), which, in turn, requires large bulky compressors and motors and relatively thick-walled and thus cumbersome sources. Typical of such air-operated sources is that described in U.S. Pat. No. 3,249,177 issued May 3, 1966 S. V. Chelminsky and assigned to Bolt Associates, Inc., East Norwalk, Conn.

Besides requiring large air compressors, these devices also have the inherent problem of generating secondary pulses due to oscillations created by the formation of an air bubble underwater. The sources thus must be shielded, vented to air, or otherwise specially handled to damp out these secondary oscillations. Typical of such apparatus are those described in copending U.S. application Ser. No. 677,279 filed Oct. 23, 1967, and U.S. Pat. No. 3,525,416 issued Aug. 24, 1970 to L. Mott-Smith, and assigned to the same assignee as this application.

Another type of air operated marine source has been developed by General Dynamics Corporation under the trademark Hydrosein, wherein a double piston arrangement is disposed in a cylinder. The double piston is first positioned with the outer piston disc closing the mouth of the cylinder. When fired, the double piston moves rapidly outwards into the fluid medium creating a vacuum behind the outer piston disc. Water then rushes into the evacuated volume behind the outer piston disc creating a pressure pulse due to the water-hammer effect when the water suddenly stops against the second, or inner, piston disc. In this type of air source the piston must accelerate the water outwardly rapidly, requiring a large force. Accordingly, high pressure air or hydraulic sources and associated large, bulky compressors, pumps, motors, etc., are still required.

SUMMARY OF THE INVENTION

The invention provides a marine seismic source which employs fluid such as air, oil, etc., as an operating medium, and which substantially utilizes the hydrostatic pressure surrounding it to generate a high pressure pulse suitable for seismic exploration. The general concept involved is to first "slowly" transpose an expandable or translatable member to a first position to thus define a first confined volume, and thereafter substantially utilize the force exerted by the hydrostatic fluid medium to rapidly accelerate the member at its terminal velocity to a second position. That is, the volume is allowed to collapse rapidly. The motion of the member is suddenly arrested upon reaching the second position, i.e., the collapse of the volume is suddenly arrested, whereby a single high-pressure pulse is generated by the sudden stoppage of water against the member due to the water-hammer effect. Thus, it may be said that the pulse is generated by an implosion rather than by an explosion as in conventional air sources.

Several mechanical configurations are contemplated for implementing the general theory of the invention, as further described herein, utilizing either a cylindrical or a spherical expandable member, a circular flexible diaphragm, a translatable piston arrangement, etc. In shallow water applications, where there lacks an optimum hydrostatic pressure to move the expandable or translatable member at its terminal velocity, means may be provided to assist the acceleration of the member to its terminal velocity. In the pneumatic version an exhaust volume is provided in which to allow rapidly dumping the air used in arming the source, and in the hydraulic version an oil accumulator is provided to rapidly dump the oil used in arming the source.

The present invention is basically of greater efficiency than existing air sources, and thus provides greater signal strength with equipment of reasonable weight and dimensions. It also provides a system which inherently avoids generating multiple pulses and thus which need not resort to special adjunct damping apparatus, or special methods of operating or handling the source.

BRIEF DESCRIPTION OF THE DRAWINGS

FIG. 1 is a cross-section of an embodiment of the present invention utilizing a cylindrical inflatable member.

FIGS. 2 and 3 are cross-sections of modifications to the invention apparatus.

FIG. 4 is a cross-section of the invention with additional modifications.

FIG. 5 is a cross-section of an alternative embodiment utilizing a spherical, inflatable member.

FIGS. 6 and 7 are cross-sections of alternative embodiments of the invention utilizing a circular flexible diaphragm.

FIG. 8 is a cross-section taken along line 8—8 of FIG. 7.

FIGS. 9 and 10 are cross-sections of alternative embodiments of the invention utilizing a translatable piston.

FIGS. 11 and 12 are cross-sections and associated block diagrams of the control apparatus of still other embodiments of the invention, employing translatable piston arrangements, and utilizing electro-hydraulic systems to arm and fire the apparatus.

FIG. 13 is a block diagram exemplifying an electrical control circuit employable with the invention apparatus; particularly with the FIG. 12 device.

FIG. 14 is a cross-section of still another embodiment of the invention employing a double-cone configuration which provides a compact source with the desired arming and exhaust volume relationships.

DESCRIPTION OF THE PREFERRED EMBODIMENTS

Referring to FIG. 1 there is shown an embodiment 12 of the invention employing a rigid tube 14 which defines a generally elongated cylindrical shape, having disposed about a portion thereof a generally cylindrical inflatable member 16 formed, for example, of a tough but resilient rubber or plastic. The tube 14 generally provides the support body for the source, and as shown is formed of two integral sections, 18, 20 which may have different diameters to provide thus an exhaust volume 22 of the order of several times that of an "arming" volume 24; e.g., four times the volume. The section 20 is provided with a large plurality of holes 26 of selected size, shape and arrangement. The inflatable member 16 is secured at either end thereof to the respective end of the perforated section 20 by fasteners 28 such as, for example, hose clamps or crating bands, wherein the perforated area of the section 20 is enclosed by the member 16.

The volumes 22, 24 are separated by a flange 30 disposed as by welding within the tube 14. A seal seat 32 is provided about the periphery of a valve opening 33 in the flange 30 wherein the seal seat 32 receives in sealed relation a matching valve disc 34. The disc 34 is axially translatable within the tube 14, preferably by an electrically actuated solenoid 36 coupled thereto. The solenoid 36 is positioned and secured within the tube 14 as by means of support brackets 38 or other suitable support. Energizing current is introduced to the solenoid 36 via a pair of electrical leads 40. The elements 30–40 and associated electrical controls (not shown) comprise, in essence, an electrically actuated, fast valve means 42, which closes to "arm" and opens to "fire" the air source of the invention. The elements and operation of the valve means 42 may be arranged whereby the valve is closed by a spring and opened by pulsing the solenoid 36, or vice versa. Or two solenoids may be provided to actuate the valve in either direction.

An exhaust line 44 is connected to the exhaust volume 22 of section 18, and a pressure line 46 is connected to the volume 24 of section 20. The lines 44, 46 are coupled to respective vacuum and pressure pumps, or may be connected via a single, dual purpose pump (herein indicated by numeral 48) to define a closed loop, air supply and exhaust system. That is, dual purpose pump 48 may be inserted in lines 44, 46 whereby air is exhausted to achieve atmospheric pressure, or even a vacuum in volume 22 via line 44, while the exhausted air is pumped under selected pressure to the volume 24 via line 46.

In operation, the invention source 12 is suspended under the water surface at a selected depth, e.g., 30 feet, via a cable (not shown) secured to an eye bolt 50 welded on the end of the tube 14. Valve disc 34 is held against the seal seat 32 (position shown in phantom line) via the solenoid 36, to thus isolate the enclosed volumes 22, 24 of sections 18, 20 respectively. Pump 48 is actuated to reduce the pressure within volume 22 to a selected value, e.g., atmospheric or lower, and simultaneously to increase the pressure within the volume 24 to some value greater than the hydrostatic pressure of the water about the source 12. The increased pressure within section 20 is transmitted via the holes 26 to the inside surface of the inflatable member 16. Since the internal pressure is greater than the external (hydrostatic) pressure, the inflatable member is expanded from its "normal" or collapsed state, to an inflated state as depicted in phantom line and indicated by 16', to define a selected, relatively large, diameter and thus volume about the section 20. In the customary operation of these devices the process of inflating the member 16 may approach several seconds, and accordingly, a relatively small pump 48 is required. For example, a compressor of the order of ten horsepower, which is capable of delivering air under 30–40 p.s.i., will suffice.

By way of example only of typical operating parameters of the source of FIG. 1, if the source 12 is disposed 30 feet under the water surface, the volume 22 may be exhausted to atmospheric pressure or less. The volume 24 is pumped to about 35 p.s.i. to provide a pressure differential of 5 p.s.i., which thus inflates the member 16. If volume 22 is approximately four times larger than volume 24, upon opening valve means 42 to fire the source, the air pressure in both volumes would then equalize to about 20 p.s.i. This results in a 10 p.s.i. differential pressure between the volumes 22, 24, which differential is relatively less than 30 p.s.i. of the hydrostatic pressure. Note that valve opening 33 is relatively large, allowing rapid passage of air pressure. Thus the inflated member 16' collapses abruptly to its second position against the wall of the perforated section 20. Note that the elastic property of the member 16 also helps in returning the member to its collapsed state around the section 20. The water surrounding the member in its expanded position 16' accelerates towards the section 20, whereupon it is suddenly arrested when the member 16 collapses against section 20. The sudden stoppage of water against a "solid" member generates a sound impulse due to the water-hammer effect, which can be utilized as a marine seismic signal. Note that there are no appreciable forces tending to cause the expandable member 16 to again expand, so that only a single pulse is generated by the invention source.

Since the time available to remove the compressed air from behind the expandable member 16, i.e., from volume 24 is much too short to allow exhausting to air at the water surface, the section 18 provides the exhaust volume 22 in the immediate vicinity of the arming volume 24. By way of explanation, a pipe 30 feet long, extending from the source to the surface, allows no air to issue therefrom at the surface until $30/1100$ seconds, or about 30 milliseconds, after a valve is opened at the source end. (The velocity of sound in air is equal to 1100 feet/second.) However, the invention source contemplates the complete collapse of the expandable member in this amount of time. Thus the air behind the expandable member 16 must be removed in a time period less than 30 milliseconds to allow the member to reach its proper (terminal) velocity. Accordingly, some means (volume 22) must be provided immediately adjacent the source, to provide mass dumping of the air behind the expandable member.

The usual water-hammer pulse is very narrow, generating too wide a bandwidth of frequencies for seismic purposes. This in turn wastes energy. Accordingly, the duration of the pulse that is generated may be adjusted by adjusting the rate at which the expandable member 16 is arrested during its final approach against the perforated section 20. To this end, referring to FIGS. 2 and 3, there are shown modifications to the apparatus of FIG. 1 to provide a cushioning effect during termination of the acceleration of the expandable member 16. Thus, in FIG. 2, a plurality of air pockets or grooves 52 are formed in the outer surface of the perforated section 20, alternate to the position of the holes 26. The pockets or grooves 52 can be formed continuously about the circumference of the section 20, or may be individual depressions formed in the outer half of the wall. Further, the pockets or grooves 52 may be formed in the confronting inner circumference of the member 16. Thus upon collapse of the inflatable member 16, air is trapped between the inflatable member and the pockets or grooves 52 to thereby cushion the member in its final approach against the surface of section 20. This cushion provides a decrease in the speed of collapse of the inflatable member 16, thus increasing the width of the pulse generated by the source 12. This decreases the bandwidth and concentrates the acoustic energy into the useful band of seismic frequencies. Thus the various cushioning means provide an increase in source efficiency, as well as a decrease in excessive strain on the apparatus.

Although two embodiments are shown for cushioning the collapse of inflatable member 16, it is to be understood that various other means could be used to provide the cushioning effect.

In the embodiment of FIG. 3 a resilient material 54 such as rubber, plastic, etc., is disposed between the inflatable member 16 and the perforated section 20. The cushion material 54 has perforations therein as at 56, in register with the perforation 26 in the section 20, to allow ready passage of air therethrough to the inflatable member 16. The material 54 compresses in the final stages of the collapse of the member 16, whereby the process of deceleration is slowed to thus increase the width of the generated pulse.

Referring to FIG. 4 there is shown a further modification to the apparatus of FIG. 1. The volume 24 within section 20 is decreased by securing a conical member 58 at the lower end of the section 20 in water-tight relation. The apex of the conical member 58 is disposed along the axis of the section 20 at a position approaching the flange 30. Since the exhaust volume 22 should be preferably several times larger than the arming volume 24, decreasing the latter allows a decrease in the size of the section 18. This allows a decrease in the overall size and weight of the invention source. Obviously, the various cushions of FIGS. 2 and 3 may be utilized in the device of FIG. 4.

Referring now to FIG. 5, there is shown an alternative embodiment of the invention utilizing a spherical inflatable member 62, in place of the cylindrical inflatable member 16 of the device 12 of FIGS. 1-4. The spherical inflatable member 62 is supported in its collapsed position by a spherical section 64, which replaces the cylindrical section 20 of FIG. 1. The spherical section 64 has perforations 26 of selected size, shape and arrangement. The inflatable member 62 is held in position by a fastener 66, such as a hose clamp, etc. Accordingly, a volume 68 is defined by the spherical member 64, which volume is in communication with the pressure line 46. Note the components of the upper portion, e.g., section 18, exhaust volume 22, valve means 42, etc., are generally similar to similar components of source 12 of the previous figures, wherein like elements have similar numerals.

Since the volume 68 defined by spherical member 64 may be somewhat large, thus requiring a relatively larger volume 22 and section 18, the invention contemplates the use of an enclosed sphere 70 (shown in phantom line) substantially concentrically secured within the section 64 as by means of brackets 72, etc. The sphere 70 is sealed and provides a reduction in the total volume 68 within the spherical section 64 to thereby allow a decrease in the size of section 18 and thus in the overall size of the source. The spherical section 64 may be formed in sections, which are placed within the spherical expandable member 62 through the opening therein then secured therein as by means of brackets, bolts, etc. (not shown), extending between the sections. Or the outer spherical section may be formed of strips welded together around the inner sphere 70.

The operation of the source 60 of FIG. 5 is analogous to that of source 12 of FIG. 1, wherein the inflatable member 62 is expanded as by means of air delivered to volume 68 via pressure line 46. The solenoid 36 seals disc 34 against the seal seat 32 of flange 30 to isolate the volumes 22 and 68. The inflatable member 62 expands, to the position shown in phantom line and indicated by numeral 62'. Upon triggering the solenoid 36, the inflatable member 62' returns to its collapsed position against the spherical section 64, whereupon the seismic pulse is created by the water-hammer effect when the member suddenly stops against the section 64.

Referring to FIG. 6, there is shown another embodiment 74 of the invention, utilizing a flat, circular, flexible diaphragm 76 to provide the generation of a seismic pulse. In FIG. 6, similar elements of the upper half of the source 74 utilize numerals similar to those of previous figures, wherein however modified elements are indicated by a prime. Thus the source 74 utilizes a generally cylindrical shape, defined herein by way of example only as a substantially constant diameter tube 14'. The tube 14' is formed of an upper section 18' having a volume 22' and a lower section 78 having a volume 80. Obviously, the diameters, axial lengths, etc., of sections 18' and 78 can vary depending upon the volumes, diaphragm size, etc. A relatively large circular flange 30' defines one extremity of volume 22 and has a central opening 33' therein. The flange 30' has a valve seat 32 against which the solenoid 36 urges the valve disc 34 to provide isolation between the volumes 22, 80. The tube 14' extends beyond flange 30' and defines the section 78, wherein the furthest extremity of volume 80 is defined by a circular plate 82. Plate 82 has perforations 84 therein, which provide a function similar to that provided by the perforations 26 of the sources of FIGS. 1 and 5. The plate 82 provides a stop and thus support for the flexible diaphragm 76 in its normal, i.e., collapsed state. The diaphragm is secured about its outer periphery to the plate 82 as by means of a narrow ring 86 and a plurality of bolts 88 spaced thereabout, or by other suitable fastening means.

The operation of source 74 is similar to that previously described, wherein the diaphragm 76 is expanded to its inflated position (indicated in phantom line and numeral 76') by means of air introduced under pressure through pressure lines 46 thus defining an initial volume of water displacement. The source is fired by opening the valve means 42 to allow the rapid escape of air from volume 80 to volume 22 via large opening 33', whereby the hydrostatic pressure rapidly urges the inflated diaphragm 76' to its collapsed state. The sudden stoppage of diaphragm 76 against the plate 82 provides a corresponding stoppage of the water confronting the diaphragm, to thus generate a single seismic pulse by means of the water-hammer effect. It is to be understood that the cushioning means of FIGS. 2 and 3 also may be utilized in the source 74 of FIG. 6.

FIG. 7 shows a modification of the device of FIG. 6, wherein a source 90 utilizes the general construction of source 74 of FIG. 6, but wherein the "armed" volume (via volume 80) of source 74 is provided only when the flexible diaphragm is inflated. Thus the circular flexible diaphragm 76 is disposed in its collapsed state, not against a perforated plate but instead against a plate 92 having only a valve opening 33' therein. Thus plate 92 provides the functions of both the flange 30' and the plate 82 of the source 74 of FIG. 6. Pressure line 46 is coupled through the plate 92 as at 93 to allow the introduction of air between plate 92 and the diaphragm 76. Closure of the valve disc 34 against the seal seat 32 allows the diaphragm 76 to be inflated to the "armed" position shown in phantom line and indicated by numeral 76' thus forming the volume 94. At such time as the source is fired, valve means 72 is actuated to displace valve disc 34 from the valve seat 32 in plate 92. The temporary volume 94 existing between plate 92 and the inflated diaphragm 76', is thus communicated with the exhaust volume 22 via the relatively large valve opening 33', and the flexible diaphragm 76 collapses against the plate 92. The confronting water accelerates against the collapsed diaphragm 76 supporting plate 92, causing the generation of an acoustic pulse via the water-hammer effect, as previously described.

Referring now to FIG. 8, there is shown the bottom view of the plate 92 of source 90, whereby means is provided during collapse of the diaphragm 76 to prevent the trapping of excessive air between the diaphragm 76 and plate 92. That is, although some cushioning is desired to increase the width of the pulse, the rapid collapse of the diaphragm 76 directly against the relatively larger expanse of the unperforated plate 92 may cause excessive trapping of air, since all the air must travel radially inward across the face of the plate and through the valve opening 33'. Thus a series of radially extending grooves 96 of increasing depth approaching the opening 93, are machined into the surface of the plate 92 which confronts the diaphragm 76. Upon collapse of the diaphragm 76, the air is pushed radially inward towards the center of the plate 92, to be urged through the valve opening 33', while still providing a partial cushioning effect which improves the pulse width of the generated seismic signal.

Referring to FIG. 9, there is shown an alternative embodiment 100 of the invention, wherein the upper portion of the tube 14 includes section 18 defining volume 22, as in the previous sources. As before, similar elements are similarly numbered. However, the source 100 utilizes a solid piston means 102 axially translatable within a lower section 104 of the tube 14, rather than any type of elastic member. Section 104 is analogous to previous sections 20, 64, 78 and defines therewithin a volume 106 which is separated from volume 22 by means of a circular flange 108. Flange 108 has a central bore 110 therein, and a valve opening 112 radially disposed from the center. The periphery of the valve opening 112 is adapted within the seal seat 32 against which the valve disc 34 seals. A piston 114 is slidably disposed within the section 104, and co-axially extending piston rod 116 is secured to the piston 114 and extends therefrom through the central bore 110 in the flange 108. A retaining washer and nut 118 may be provided on the rod 116 to limit the travel of piston 114 towards the open end of section 104. As an alternative, a rim (not shown) may be formed within the inside periphery of the open end of section 104 to retain therein the piston 114, thus omitting the need for the retaining washer and nut 118. A suitable seal (O-ring) is provided between the opening 110 and the rod 116. Likewise a seal 120 (O-ring) is provided in the outer periphery of piston 114 and against the inside surface of section 104. An annular stop member 122 is integrally secured within the section 104 to provide means for suddenly stopping the piston travel, to thus provide the seismic signal via the water-hammer effect in accordance with the invention.

In operation, air is supplied via pressure line 46 into volume 106, thereby urging the piston 114 against the water to a first "armed" position approaching the open end of section 104, as shown in phantom line and indicated by numeral 114'. At this time disc 34 is sealed against the seal seat 32 of flange 108, thus isolating volume 106 from volume 22. Solenoid 36 is triggered to open disc 34 when firing the source, whereby the hydrostatic pressure rapidly accelerates the piston 114 within section 104. The piston is suddenly stopped via the stop member 122, with a corresponding sudden stoppage of the water which bears against piston 114. The generation of the seismic pulse is caused via the water-hammer effect. Cushion means such as rubber strips, springs, air pockets, etc., may be provided to slow the arresting speed of the piston 114 to improve the generated seismic pulse.

Referring now to FIG. 10, there is shown a modification of the source 100 of FIG. 9, wherein similar elements of an embodiment 124 are similarly numbered. Thus the tube 14 comprises a section 18 and a section 104. The volume 22 of section 18 is isolated from the volume 106 of section 104 by means of a flange 126 having a single valve opening 128 therein. A seal seat 32 is provided about opening 128 for receiving the valve disc 34 actuated by solenoid 36. Pressure line 46 provides air under pressure to the volume 106. The piston 114 and rod 116 of FIG. 9 is replaced in FIG. 10 by a cylindrical sleeve 130, having a radially inwardly extending rim 132 of inside diameter slightly larger than the outside diameter of section 104. A radially outwardly extending rim 134 is provided on the open end of the section 104, the outer circumference of which fits snugly but slidably within the inside diameter of the cylindrical sleeve 130. Seal means 136 is provided between the outer circumference of rim 134 and the inside circumference of sleeve 130. It may be seen that rims 132, 134 engage to provide a stop which defines the outermost limit of travel of the sleeve 130 as is shown in phantom line and indicated by numeral 130'. To arm the source 124, the valve disc 34 is sealed against the seal seat 32, and air is supplied to volume 106 via pressure line 46. To fire the source 124, disc 34 is opened and the air under pressure in volume 106 is released into the lower pressure volume 22. The hydrostatic pressure of the water rapidly accelerates the sleeve 130 to the position shown against the end of section 104. At such time, the sleeve 130 abruptly stops causing the seismic pulse generation via the water-hammer effect. As previously discussed, cushioning may be provided between the section 104 and sleeve 130.

The various embodiments of the invention described hereinbefore utilize primarily the hydrostatic pressure of the surrounding water to impart an acceleration to the inflatable member of the translatable piston. In the expandable member type of devices, the elasticity of the member also aids the acceleration thereof to the collaped state. To a lesser degree the pressure differentials existing within the piston type source also account in part for the acceleration of the piston member.

Referring now to FIG. 11, there is shown a modified embodiment 140 of the invention, utilizing hydraulic means rather than pneumatic means to arm and initiate the acceleration of a piston, to effect a seismic pulse via the water-hammer effect. The embodiment 140 is particularly useful in shallow water applications, wherein the hydrostatic pressure of the water is not sufficient to impart the terminal velocity to the piston, whereby the optimum efficiency of the water-hammer effect may not be fully realized. Note that the hydraulic means of the embodiment of FIG. 11 may be utilized with various modifications in the previous embodiments of FIGS. 6–10 hereinbefore described, and is not limited to use with the configuration of FIG. 11. For example, a pneumatic or hydraulic cylinder (not shown) may be mounted on the volume-dividing plate (e.g., 30', 92, 108, 126) and secured via the cylinder rod (not shown) to the flexible diaphragm, sleeve or piston at the center thereof. The resulting mode of operation would be similar to that of FIG. 11 further described below.

Referring to FIG. 11 there is shown the embodiment 140 comprising a rigid tube 142 analogous to the tubes (14, 14') of the previous embodiments. A generally cylindrical sleeve or piston 144 is disposed in translatable relation within a section 146 of the tube 142. Seal means 148, such as an O-ring, packing, etc., is disposed within the outer perliphery of the piston 144 at its open end to provide a seal between the piston and the facing inner surface of the section 146. A circular end plate 150 which defines the extremity of a volume 151, is integrally secured as by welding to the end of the tube 142. Hydraulic actuator means 152 includes a hydraulic cylinder 154 secured to the end plate 150 to extend coaxially therefrom within the cylindrical piston 144. A hydraulic piston 156 is disposed in translatable relation within the cylinder 154 and is coupled to the piston 144 via a piston rod 158. Seals 159, 161 are provided between the rod 158, the piston 156, and the respective confronting portions of the hydraulic cylinder 154. Thus as may be seen, translation of the piston 156 within the cylinder 154 imparts like movement to the piston 144 within the section 146.

Hydraulic control means 160 is disposed in part within the section 146 adjacent the hydraulic actuator means 152, to control the initial positioning of the piston prior to firing, and to provide the adjuct feature of assisting the acceleration of the piston 144 from its extended, "armed" position (shown in phantom line and indicated by numeral 144') to the closed or "fired" position shown. Note that the various volumes, valves, etc., of the hydraulic actuator means 152 and the hydraulic control means 160 are generally analogous to the valve means 42 and volumes 22, 24, 68, 80, 94 and 106 of the previous embodiments. That is, these elements perform essentially the same functions in the hydraulic system of FIG. 11 (and also FIG. 12 below) as in the pneumatic system of FIGS. 1–10.

The hydraulic control means 160 includes a main four-way valve 162, which has two outlets coupled to the opposite ends of the cylinder 154 via the lines 164, 166. A four-way pilot valve 168 is coupled via two outlets to the main valve 162. A high pressure, oil inlet line 170, is coupled to both the pilot and main valves 168, 162 respectively, and a low pressure oil outlet line 172 is also coupled to both the pilot and main valves. The lines 170, 172 enter via plate 150. A magnetic actuator 174 is operatively coupled to the pilot valve 168 and is connected to an energizing supply (not shown) via an electrical lead 176. Oil is supplied to the high pressure line 170 by suitable pump means 178. A reservoir 179 integrally associated with the pump 178, is coupled to the low pressure outlet line 172. A high pressure accumulator 180 which begins to fill for example at 1000 p.s.i., is coupled to the high pressure line 170. A low pressure accumulator 182 which begins to fill, for example at 50 p.s.i. is coupled to the low pressure line 172.

In operation, oil is fed to the pilot and main valves 168, 162 respectively via the pump 178 and accumulator 180. To ready the source 140 for firing, high pressure oil is supplied via line 166 to the corresponding surface of the hydraulic piston 156, whereby the piston, rod 158, and thus the main piston 144 are moved outwardly to the extended armed position indicated by numeral 144', thus providing a second confined volume 151'. The oil in the opposite portion of the cylinder 154 is forced therefrom via line 164 into the low pressure oil outlet line 172. At such time as the source is to be fired, the magnetic actuator 174 is energized from the surface, whereby the pilot valve 168 is caused to direct the high pressure oil from the oil inlet line 170 to the lower portion of the hydraulic cylinder 154 via the line 164. Simultaneously, the oil in the opposite end of the hydraulic cylinder 154 is channeled through the main valve 162 via line 166, and thence to the low pressure accumulator 182 and reservoir 179 via the low pressure oil and outlet line 172. Thus upon firing, the piston 144 is rapidly accelerated to its terminal velocity by both the hydrostatic pressure of the surrounding water, and the high pressure oil which is introduced to the hydraulic piston 156. Sudden arrest of the piston 144 within the section 146 provides the seismic pulse via the water-hammer effect, in accordance with the invention. Note that suitable air cushioning, etc., may be provided as in other embodiments herein.

It is to be understood that a double piston configuration may be employed, wherein a second piston (144) is co-axially disposed on the opposite side of the end plate 150, within an associated extension of the tube 142. The second piston is operated simultaneously via a respective hydraulic actuator means and control means similar to means 152 and 160 heretofore described. Operation is accomplished by the same energizing pulse delivered to the respective magnetic actuators. Thus both pistons are accelerated towards each other at the same instant and at the same terminal velocity to provide a single seismic pulse. It is to be understood that the control means of the source shown in FIG. 11, may be coupled to the second hydraulic actuator means in the dual-piston configuration, whereby a second control means (160) is not required.

Referring to FIG. 12 there is shown an alternative embodiment 184 of the apparatus of FIG. 11, employing a "one-way" hydraulic actuator means 186 and a modified hydraulic control means 188, analogous to the means 152 and 160 respectively of FIG. 11.

More particularly, a preferably cylindrical tube 190 hereinafter termed a water cylinder forms the support body for the source 184 and is analogous to the tubes 14, 14', 142 of the previous embodiments. The water cylinder 190 is closed at one end by means of a circular plate 192, or may be integrally formed as in FIG. 11, and the opposite end thereof is provided with an outwardly extending rim 194 about the circumference thereof. A sleeve or water piston 196 is provided with a closed end via a plate 198 or the like, and the open end has a diameter which allows a snug but slidable fit over the closed end of the water cylinder 190. A rim 200 is integrally formed about the outer circumference of the closed end of the water piston 196. Suitable seal means 202 such as, for example, O-ring, or preferably a Johns-Manville packing, sold under the trademark Uneepac deep base, is disposed between the confronting surfaces of the water cylinder 190 and water piston 196, to provide a fluid seal and thus an isolated volume 203 therebetween. The volume 203 provides a piston braking means via an air cushion effect, further described below.

A cylindrical elastic sleeve or boot 204 is secured in sealed relation about the rims 194 and 200 of the water cylinder 190 and the water piston 196, respectively, by bands or hose clamps 206. The boot 204 is formed of a tough but elastic material such as rubber, vinyl, etc., and has an axial length somewhat slightly less than or equal to the combined axial distance between the rims 194, 200 when the source is "fired," e.g., when the water piston 196 is moved towards the water cylinder 190 to reduce volume 203 to its minimum value. Thus the boot 204 is actually the length between rims 194, 200 when the piston 196 is against the cylinder 190 so as to be not stretched during assembly. The radial thickness of the rims 194, 200 are chosen to provide a selected radial spacing between the piston 196 and the surrounding boot 204. The radial spacing defines a volume 208 and prevents pinching the boot when the source fires. The volume 208 between the boot 204 and the cylinder 190 and piston 196, is preferably filled with oil, or the like, whereby upon collapse of the source the length of the volume 208 decreases but the volume displaced by the oil is constant. Thus the boot 204 is urged out away from the piston 196 against the hydrostatic pressure, and pinching of the boot is prevented. The oil further provides lubricant for the sliding piston as well as for the seal means 202. The hydraulic actuator means 186 of previous mention preferably comprises a one-way hydraulic cylinder 210 integrally secured to the plate 192 in sealed relation, and having a cylinder rod 212 extending axially through the plate and secured to the plate 198 of piston 196. Although a specific threaded hub arrangement 213 is shown herein, any suitable preferably demountable fixture may be used. Thus actuating the cylinder 210 causes the piston 196 to fully extend to its armed position (shown in FIG. 12). By way of example only, cylinder 210 may be a Sheffer hydraulic cylinder and rod, type 5UH–FF–15K.

The hydraulic control means 188 includes a main valve 214 coupled between the hydraulic cylinder 210 and low pressure accumulator means 216 via a relatively large diameter conduit 218. Main valve 214 is a pilot operated check valve which is normally closed to fluid flow away from the cylinder 210, but is opened to such flow when energized by high pressure oil via a pilot line 219. An "arming" valve 220 is disposed in a high pressure line extending from a pump or high pressure source 221, through a flow control valve 222 and to the large conduit 218 which extends between the cylinder 210 and the main valve 214. The valve 220 is a normally closed, two-way directional control valve such as manufactured by Waterman Hydraulics Corporation, Skokie, Ill., under Model No. 316, which is operated electrically via an associated solenoid. A normally closed, "firing" valve 224, similar to valve 220, is disposed between the high pressure source and the trigger line 219 of the ball valve 214, which when energized via an associated solenoid, applies high pressure fluid to the opening mechanism of the main valve. The junction between the line 219 and the output of valve 224 is also coupled to a normally open pilot dump valve 226 similar to valves 220, 224. Dump valve 226 is actuated to a closed position by an associated solenoid which is electrically coupled to the same energizing signal which is fed to the solenoid of firing valve 224 to close the latter. Thus dump valve 226 is closed to fluid flow when firing valve 224 is opened, and vice versa A fluid dump line is connected from the low pressure accumulator 216 and main valve 214 junction via a low pressure line, a flow control valve 228, and fluid return inlet to a reservoir 227 of the high pressure source 221. A high pressure accumulator 230 is disposed in the high pressure line which extends from the source to the arming and firing valves 220, 224. The solenoids of the valves 220, 224, and 226 are selectively coupled to an electrical source, such as a 12 volt direct current (DC) source via associated electrical switches (not shown) which are manually or automatically controlled. Or the solenoids are activated via more sophisticated electro-hydraulic control circuit coupled thereto and indicated herein by numeral 232. An example of an electro-hydraulic control circuit is shown in FIG. 13 below.

In operation, prior to arming the source 184, the main valve 214 is closed, the arming valve 220 is closed, the firing valve 224 is closed, and the dump valve 226 is open. To arm the source, e.g., to extend the piston 196, the arming valve is opened via an electrical signal fed thereto, to provide high pressure fluid to the cylinder 210. The valve 220 recloses upon removing the electrical signal and the source is now armed and ready to fire.

Firing is accomplished by introducing an electrical signal to the solenoids of the firing valve 224 and of the dump valve 226. High pressure fluid is delivered via the pilot line 219 to the main valve 214 to open same, whereupon the fluid in cylinder 210 is free to pass rapidly through the large conduit 218 into the low pressure accumulator 216. Some of the fluid also flows back to the source via the smaller diameter line via the flow control valve 228. The larger diameter conduit 218 and accumulator 216 provides a high rate of fluid flow from the cylinder 210, whereby the piston 196 can rapidly be urged to the closed position at its terminal velocity via the hydrostatic pressure of the water surrounding the source and the force exerted by the extended sleeve 204. The seismic pulse is generated via the water-hammer effect when the water piston 196 is suddenly stopped at the end of travel within the water cylinder 190.

Upon removing the electrical signal from the valves 224, and 226, the former closes and the latter opens to allow dumping the high pressure fluid from the pilot line 219 into the fluid return inlet of the source. The source is thus ready for the next arming and firing cycle.

Since the forces generated by the source 184 upon suddenly arresting the piston 196 are quite large and potentially destructive to the source mechanism, a braking mechanism in the form of an air cushion is preferably provided. The braking mechanism not only provides means for dissipating some of the shock and thus stresses generated, but also providess means for selectively slowing the speed of piston arrest, to thus adjust the range of useful frequencies generated in the resulting seismic pulse as discussed supra; particularly with respect to FIGS. 2 and 3.

To this end, the seal means 202 prevents the escape of air from within the volume 203 as the piston 196 closes. The amount of air cushion can be varied as desired by opening a petcock valve 234, in the plate 192 with the piston 196 extending a corresponding, selected distance from the water cylinder 190, to allow a desired amount of air at atmospheric pressure to enter the volume 203 prior to closing petcock valve 234 and immersing the source 184.

The invention further includes an adjunct arresting feature within the apparatus thereof which provides means for increasing the operating efficiency. When the piston 196 is stopped by the air cushion in volume 203 after firing, the air therein is highly compressed, which forces the piston back outwards. This outward stroke is herein termed the "bounce" stroke. If the piston were left unchecked, the oscillating effect would cause, in essence, an oscillatory air bubble effect similar to that generated by conventional air sources. However, if the oil pressure holding main valve 214 open is removed while the piston 196 is moving outward in the bounce stroke, it is possible to arrest further motion of the piston inward again when it has completed its partial, outward translation.

This action provides three features: it suppresses the "bubble"; it increases the efficiency of the source; and it lengthens the generated pulse.

To explain, the piston 196 is stopped at its outermost position because of the check-valve action of the main valve 214 when it is not held open by oil pressure via line 219. That is, while the piston is moving outward the valve 214 is held open by the flow of oil therethrough. However, when the piston 196 stops at the end of the bounce stroke and begins to return again, the reverse flow of oil closes valve 214 to arrest the flow of oil, and thus any second inward motion of the piston 196. The outward bounce stroke generates acoustic signals as does the first inward stroke, thereby increasing the length or duration of the composite, generated seismic pulse. Note that the arresting feature increases the efficiency of the source because the outward bounce stroke returns the piston 196 a large part of the way to the fully armed position without requiring any oil from the high pressure source 221; oil is drawn from the low pressure accumulator 216. Thus after the first shot (or firing cycle), only a small amount of oil is needed from source 221 to re-arm the source 184. This leads to the increased operating efficiency of previous mention.

It is to be understood that the particular arrangement and type of elements defining the hydraulic control means 188 are specified, by way of example only, and that various modifications may be made thereto within the spirit of the invention. For example, the firing and dump valves 224, 226 may be replaced by a single, 3-way valve indicated at 225 which simultaneously provides a normally-open and a normally-closed fluid flow path therethrough, and which reverses the states when actuated in the manner accomplished by the two valves 224, 226.

By way of example only, main valve 214 may be a Rexroth SV-63; arming valve 220 may be a Waterman #314; firing and dump valves 224, 226 may be Waterman #314-6-12 and #315-6-12 valves respectively, and flow control valves 222, 228, may be Waterman 190 SS valves. The low and high pressure accumulators 216, 230 may be Greer 2.5G, 30A-21/2-HF and Greer 1G., 30A-1-B devices respectively.

Referring to FIG. 13 there is shown a block diagram illustrating an electro-hydraulic circuit 236 particularly adapted for use with the source 184 of FIG. 12, but which may be variously modified for use with the other embodiments herein.

Accordingly, a manual arming command pushbutton 238 is coupled to an arming timing circuit 240, which in turn is coupled to the arming valve 220 (in the source of FIG. 12) via a power amplifier circuit 242. A manual firing command pushbutton 244 is coupled to a firing timing circuit 246, and thence to valve means 225 corresponding to the firing-dumping valve or valves 225 (of FIG. 12) via a power amplifier circuit 248. A safety switch 250 may be inserted in the line between the amplifier circuit 248 and the valve means 225 to prevent accidental firing, viz, when the switch is in the "safe" position. The arming, timing circuit 240 provides an arming signal to actuate the solenoid of the arming valve 220 when pushbutton 238 is actuated, and is further adapted to automatically close the valve 220 after a preselected time interval of the order of, for example, 2 to 4 seconds. The firing timing circuit 246 provides a firing signal to actuate the solenoid(s) of the firing-dumping valve means 225 when pushbutton 244 is pushed, and is further adapted to close (reverse) the valve means 225 after a preselected time interval of the order of, for example, 50 to 100 milliseconds.

The control circuit 236 is further adapted to provide an automatic firing command to the firing timing circuit 246 as indicated at 252, via a firing signal generating circuit 254. Automatic firing signals are provided to timing circuit 246 at a time after the arming command has been given and the arming valve 220 has been actuated to arm the source (184). In addition, as shown in phantom line, automatic arming commands may be provided via arming signal generating means (indicated at 256) which provides the arming signals at selected intervals of time such as commonly employed when performing marine surveys. The firing signal generator 254 is electrically coupled (not shown) to the arming circuit whereby the firing signals are delivered to the source as described, at selected intervals, whereby the entire arming-firing process is performed automatically. Various interlocks, indicated by line 258 are provided in the automatic arming-firing system to prevent firing before the source is fully armed, etc.

In operation, referring also to FIG. 12 by way of example, whether manually or automatically actuated, upon activation of the arming timing circuit 240, high pressure, oil enters the cylinder 210 via the arming valve 220. The valve 220 is held open long enough (e.g., 2 to 4 seconds) to allow the piston 196 to travel to its extended position, i.e., the armed position, whereupon the arming timing circuit 240 turns off the arming signal therefrom allowing the valve 220 to close. The piston is thus held in the armed position, against the hydrostatic pressure of the surrounding water by the closed valves 214 and 220.

When the firing pushbutton 244 is actuated (or automatic firing is provided via circuit 254), firing timing circuit 246 energizes valve means 225 (i.e., opens valve 224 and closes valve 226), whereby main valve 214 is opened via pilot line 219. The piston 196 collapses radially inward against the air cushion in volume 203 as previously described. During the outward "bounce" stroke of the piston 196, the firing timing circuit 246, which holds valve 224 and thus 214 open for example, 50 to 100 milliseconds, de-energizes and the valves 224, 214 close and valve 226 opens. The piston 196 is allowed to finish the outward "bounce" stroke since oil continues to pass through the (one-way) main valve 214 to the cylinder 210. However, as discussed above, when the piston 196 attempts to travel back inwardly, it is prevented from doing so by the closed valve 214 (and valve 220). Such operation of the apparatus provides the previously mentioned adjunct arresting feature which prevents further oscillations of the piston 196, while allowing it to travel outwardly to thereby provide partial "arming" of the source for increased operating efficiency.

Referring now to FIG. 14 there is shown a further embodiment 260 of the invention, employing in essence two of the cone/cylinder configurations of the FIG. 4 source, to provide a relatively compact source with smaller overall size while retaining the desired volumetric relationships. To this end, a rigid tube 262, having a large plurality of perforations 263 therein has integrally secured concentrically therein, a pair of truncated cones 264, 266. The cones are sealed at their larger circumferences, as by welding, to respective ends of the tube 262, with the smaller circumferences thereof extending towards the midpoint of the tube. A centermost portion of the cones is formed to define a (cylindrical) valve body 268 of constant diameter. A plurality of holes 270 are formed along a circumference of the valve body 268. A valve sleeve 272 is snugly but translatably disposed within the valve body 268 and has a series of holes 273 along a circumference thereof, which match holes 270 formed in the valve body 268. An electrically actuated solenoid 274 is coaxially secured within one of the cones (266) via brackets 276, and has a solenoid rod 278 extending therefrom which in turn is secured to the valve sleeve 272 via a suitable bracket or web member 280. The solenoid 274 is energized via electrical leads 282. Note that the valve body 268, valve sleeve 272, and solenoid 274 define a valve means 281 similar to the valve means 42 of previous description.

The larger ends of the cones 264, 266, are terminated in sealed relation by means of generally semi-spherical, semi-oval, etc., members 284, 286 respectively. The members 284, 286, cones 264, 266, valve body 268 and valve sleeve 272 define therewithin an enclosed, sealed, exhaust volume 288 analogous, for example to the exhaust volume 22 of the preceding figures.

A cylindrical inflatable member 290 similar to previous member 16, is secured in sealed relation to the ends of the tube 262 by fasteners 292 at respective ends thereof as described above. When the inflatable member 290 is collapsed about the tube 262 as shown, the cones 264, 266, the valve body 268 and the member 290 define therein a variable, annular, arming volume 294. An exhaust line 296 is coupled to one member (286), and a pressure line 298 is coupled in sealed relation through the member 286 to one cone 266, in communication with the arming volume 294.

In operation, high pressure air is supplied to the arming volume 294 via the pressure line 298, whereupon the inflatable member 290 (slowly) assumes an expanded position indicated by numeral 290' and shown in phantom line. Note at this time, the solenoid 274 is de-energized to allow the valve sleeve 272 to assume a "closed" position, i.e., a sleeve position 272' indicated in phantom line herein, wherein the solid portion of the valve sleeve, not the holes 273, are in register with the holes 270 of the valve body 268. The valve sleeve 272 may be held in such position by spring means, etc. (not shown). In the closed position of valve means 281, arming volume 294 thus is isolated from exhaust volume 288.

To fire the source, solenoid 274 is energized, thereby pulling the valve sleeve 272 to an "open" position, i.e., where the holes 270 and 273 are in register. This allows the pressure behind the inflated member 290' to rapidly escape into the lower pressure (atmosphere or less) in the exhaust volume 288. The inflated member 290 collapses against the perforated rigid tube 262 causing the generation of the seismic pulse.

What is claimed is:
1. A marine seismic source for generating successive single pulses of energy in a surrounding water medium comprising the combination of:

support means defining in part at least an arming volume;

movable member means movably supported by the support means for contact with the surrounding water medium at only the outer surface thereof;

fluid source means operatively coupled to the movable member means to slowly urge and maintain the latter outwardly via the generation and maintenance of pressure therebehind to define a first volume corresponding to said arming volume, which first volume displaces a portion of the surrounding water medium;

actuating means associated with the movable member means and including the hydrostatic pressure of the water medium against the movable member means for rapidly collapsing the first volume to lesser volume;

valve means operatively associated with said movable member means and said fluid source means to maintain the pressure behind the movable member means when the latter defines said first volume, and including energizing means coupled thereto to initiate the collapse of the first volume by releasing the pressure behind the movable member means; and stop means integral with the support means to suddenly arrest the collapsing volume upon reaching the lesser volume over a selectable and variable time period, to also arrest the inward motion of the portion of the surrounding water medium during said time period to generate a single energy pulse due to the water-hammer effect.

2. The marine seismic source of claim 1 wherein said fluid source means includes a pressurized air source;

said support means further includes an exhaust volume of predetermined size and relatively lower pressure relative to the arming volume;

said valve means being disposed to selectively isolate the arming and exhaust volumes when the movable member means is in the first position, and to communicate the arming and exhaust volumes to rapidly remove the pressure behind the movable member means when enabled to an open position in response to the energizing means.

3. The marine seismic source of claim 2 wherein the support means includes first and second rigid hollow sections integrally secured together;

said first section having a plurality of perforations formed therein;

said valve means includes, a valve disc disposed to isolate the volumes of the two sections from each other when the movable member means is in said first position, and to communicate the two sections when opened via the energizing means; and the movable member means comprises an elastic member secured in pneumatically sealed relation to the first section and covering the plurality of perforations;

wherein introduction of air from the pressurized air source into the first section under predetermined pressure greater than the hydrostatic pressure inflates and maintains the elastic member until the valve disc is opened.

4. The marine seismic source of claim 3 wherein said first section is a cylinder, said perforations are spaced along a selected circumferential region thereof; and said elastic member defines an elastic cylinder which is concentrically disposed about the cylinder of the first section with either end of the cylindrical elastic member sealably secured to respective ends of the section cylinder.

5. The marine seismic source of claim 4 further including a conical member secured at its base to the circumference of the depending end of said cylindrical first section, with the apex of the conical member extending coaxially within the cylinder to reduce the volume within the cylindrical first section.

6. The marine seismic source of claim 3 wherein said first section is a cylinder with a circular flat plate secured to the end thereof, said perforations are spaced along a selected circular region of the plate, and said elastic member is a circular elastic diaphragm concentrically disposed against the circular flat plate and sealably secured about its periphery to the latter.

7. The marine seismic source of claim 3 wherein said first section is at least a partial spherical section, said perforations are spaced about a selected portion of the partial spherical section, and said elastic member is at least a partial sphere concentrically disposed about the spherical section and sealably secured along a continuous arcuate area thereof to the section.

8. The marine seismic source of claim 3 further including means for cushioning and thus slowing the abrupt arrest of the elastic member against the first section, said cushioning means including selected cushion volume for trapping air disposed between the elastic member and the first section.

9. The marine seismic source of claim 2 wherein the support means includes a cylinder having a plurality of perforations therein;

said elastic member defines an elastic cylinder secured at either end to respective ends of the perforated cylinder to enclose the perforations;

a pair of conical members coaxially disposed within the perforated cylinder with smaller ends confronting;

said valve means being disposed integral with the conical members to define when closed the isolated arming volume between the cylinder and conical members;

cap members sealably secured to either end of the perforated cylinder;

said exhaust volume being defined by the cap members and the conical members.

10. The marine seismic source of claim 1 wherein the movable member means includes rigid piston means translatably disposed relative to the support means to define therein the arming volume corresponding to the first volume of water displacement;

said valve means being disposed to isolate the arming volume to maintain said pressure and thus the rigid piston means in the first position, and to open passage to the arming volume to rapidly release the pressure and thus the rigid piston means.

11. The marine seismic source of claim 10 wherein the support means includes first and second sections defining the arming and exhaust volumes respectively, the rigid piston means being translatably disposed relative to the first section;

said valve means includes a valve disc disposed to selectively isolate the arming and exhaust volumes to maintain the pressure and thus the rigid piston means in its first position;

said fluid source means provides a relatively low pressure in the exhaust volume relative to the arming volume; and said energizing means includes a given source of energy adapted to energize the valve means to selectively translate the valve disc from the closed to an open position to communicate the arming and exhaust volumes and rapidly remove the pressure behind the rigid piston means.

12. The marine seismic source of claim 10 wherein the fluid source means includes hydraulic actuator means coupled to a hydraulic control system and including a hydraulic cylinder having a translatable rod, said hydraulic cylinder being secured to the support means and the end of the rod being secured to the rigid piston means to translate the rigid piston means to the first position, said valve means includes main valve means coupled to the hydraulic cylinder to maintain pressure behind the latter, wherein said hydraulic control system includes low pressure accumulator means coupled to the hydraulic cylinder via the main valve means, said energizing means includes means integral with the hydraulic control system to selectively actuate the main valve means to open a passage between the hydraulic cylinder and the low pressure accumulator means to rapidly direct the high pressure fluid to the latter.

13. The marine seismic source of claim 12 wherein the hydraulic control system further includes;

a source of high pressure fluid including a pump and fluid reservoir, arming and firing valve means coupled between the high pressure source and the hydraulic cylinder and main valve respectively, the arming and firing valve means including means for returning fluid to the fluid reservoir, said low pressure accumulator means also being coupled to the reservoir;

said energizing means including solenoids associated with respective valves, and a source of electrical energy selectively coupled to the solenoids to energize same.

14. The marine seismic source of claim 12 including cushioning means associated with the translatable rigid piston means for slowing the abrupt arrest to lengthen the duration of said generated seismic pulse and to prevent contact between the rigid piston means and the support means, wherein the piston means rebounds outwardly after arrest by the cushioning means;

said energizing means includes timing means for actuating the main valve means to an open position for a selectable period of time commensurate with the rigid piston means inward translation, and for closing the main valve means prior to the end of the outward rebound of the piston means.

15. The marine seismic source of claim 10 further including resilient boot means sealably secured to the support means and to the translatable rigid piston means to enclose an isolated annular volume about the outer surfaces of the support and piston means, said annular volume being filled with an incompressible fluid.

16. The marine seismic source of claim 1 wherein the energizing means includes arming means for selectively providing an arming signal;

timing means operatively coupled to the fluid source means for receiving the arming signal and delivering an operating command of selected duration in response thereto to slowly apply and maintain fluid pressure behind the movable member means;

firing means for selectively providing a firing signal after the movable member means is armed via the maintained pressure;

timing means operatively coupled to the fluid source means and to said valve means for receiving the firing signal and delivering a firing command of selected duration in response thereto to rapidly remove the fluid pressure from behind the movable member to fire the source.

References Cited

UNITED STATES PATENTS

| | | | |
|---|---|---|---|
| 3,376,949 | 4/1968 | Baker et al. | 181—5 H |
| 3,105,456 | 10/1963 | Gongwer | 116—27 |
| 3,369,519 | 2/1968 | Bricout | 181—5 H |
| 3,506,085 | 4/1970 | Loper | 181—51 C |
| 3,368,641 | 2/1968 | Cholet et al. | 181—51 C |
| 3,315,755 | 4/1967 | Brooks | 166—177 |
| 3,318,411 | 5/1967 | Doubt | 181—5 |
| 3,367,442 | 2/1968 | Setser | 181—5 H |
| 3,564,492 | 2/1971 | Magneville et al. | 181—5 H |

OTHER REFERENCES

Institut Francais du Petrole, Flexichoc, pp. 1–4, January 1970.

BENJAMIN A. BORCHELT, Primary Examiner

N. MOSKOWITZ, Assistant Examiner

U.S. Cl. X.R.

181—5 NC